June 18, 1963 G. DIRKS 3,094,684

SORTING OF SIGNALS RECORDED ON A MAGNETIZABLE SIGNAL CARRIER

Original Filed March 30, 1955 9 Sheets-Sheet 1

INVENTOR

Garlard Dirks

BY

Michael S. Striker

INVENTOR.
Gerhard Dirks
BY
Michael S. Striker
Atty

June 18, 1963 G. DIRKS 3,094,684

SORTING OF SIGNALS RECORDED ON A MAGNETIZABLE SIGNAL CARRIER

Original Filed March 30, 1955 9 Sheets-Sheet 3

INVENTOR.
Gerhard Dirks

BY

Michael S. Striker
Atty

June 18, 1963 G. DIRKS 3,094,684

SORTING OF SIGNALS RECORDED ON A MAGNETIZABLE SIGNAL CARRIER

Original Filed March 30, 1955 9 Sheets-Sheet 4

INVENTOR.
Gerhard Dirks
BY
Michael S. Striker
Attorney

INVENTOR.
Gerhard Dirks
BY
Michael S. Striker
Attorney

INVENTOR
Gerhard Dirks
BY
Michael S. Striker
agt.

INVENTOR
Gerhard Dirks
BY Michael S. Striker
agt

SORTING OF SIGNALS RECORDED ON A MAGNETIZABLE SIGNAL CARRIER

Original Filed March 30, 1955 9 Sheets-Sheet 8

INVENTOR
Gerhard Dirks
BY
Michael S. Striker
agt.

INVENTOR
Gerhard Dirks
BY Michael S. Striker
agt.

United States Patent Office 3,094,684
Patented June 18, 1963

3,094,684

SORTING OF SIGNALS RECORDED ON A MAGNETIZABLE SIGNAL CARRIER

Gerhard Dirks, 44 Morfelder Landstrasse, Frankfurt am Main, Germany

Continuation of application Ser. No. 498,044, Mar. 30, 1955. This application Nov. 2, 1960, Ser. No. 66,884
Claims priority, application Germany Oct. 1, 1943
6 Claims. (Cl. 340—172.5)

This invention relates to means for the sorting of signals recorded on a magnetizable signal carrier.

The present application is a continuation of my application Serial No. 498,044, filed by me on March 30, 1955, now abandoned, and entitled "Sorting of Signals Recorded on a Magnetizable Signal Carrier," which application Serial No. 498,044 is a continuation-in-part of my application Serial No. 101,032, filed by me on June 24, 1949, now abandoned, and entitled "Novel Electronic Office Machine Computing-, Storing- and Sorting-Mechanism."

One object of the invention is to make possible the sorting of "unities" of a signal carrier, e.g. successive lengths of a magnetizable tape comparable to the handling of punched cards, but with much more ease, at much less cost and in much smaller space.

The invention provides an apparatus for sorting into classes information items which are recorded as signals in a first magnetizable track by the magnetic state thereof, each item comprising two or more characters and being represented by a group of such magnetically recorded signals, including a sensing means for sensing the said groups of signals in turn during one sensing cycle, a plurality of magnetic recordingq means cooperating with a like plurality of magnetizable recording tracks, each such recording track being allocated to recording items of a different one of said classes, and means operative in response to the sensing within each of such items of a character-representing signal designating the class to which the item belongs, to select the appropriate one of said recording means and to effect the transfer during said one sensing cycle of the corresponding items to their appropriate recording tracks.

In one form the information is selectively transferred unity by unity to its allocated tape and in another form it is transferred to all the tapes and erased from all but the allocated tape.

Figure 13A:
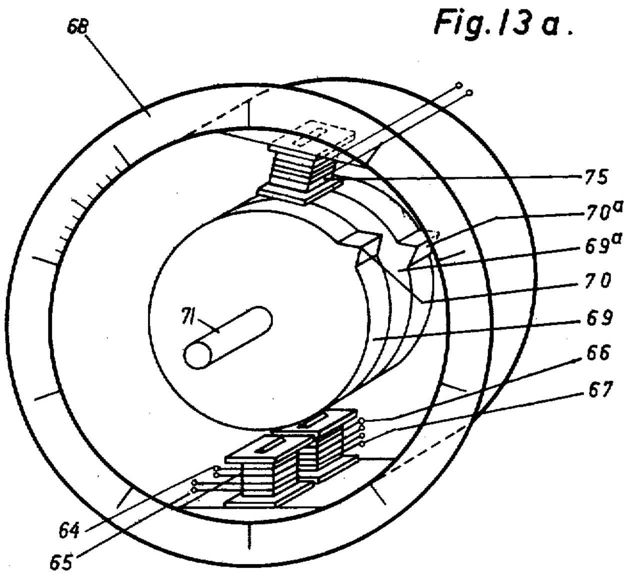
Figure 13B:
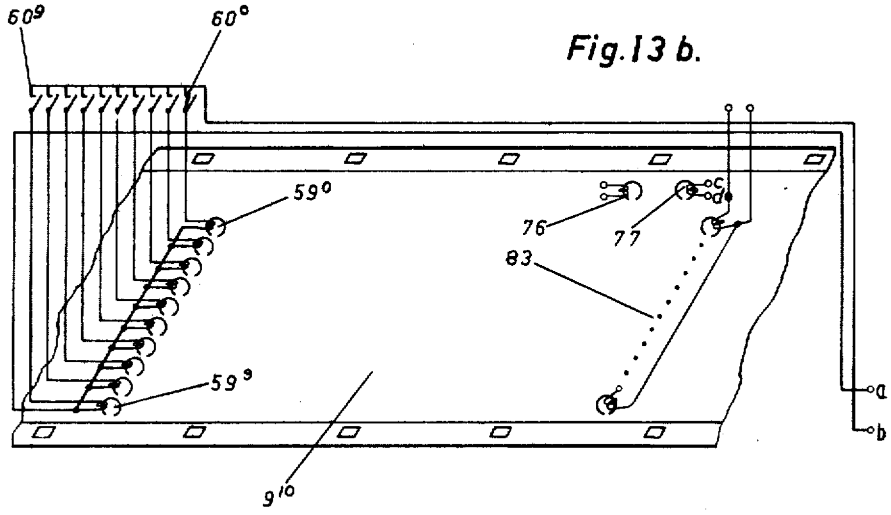
Figure 13C:
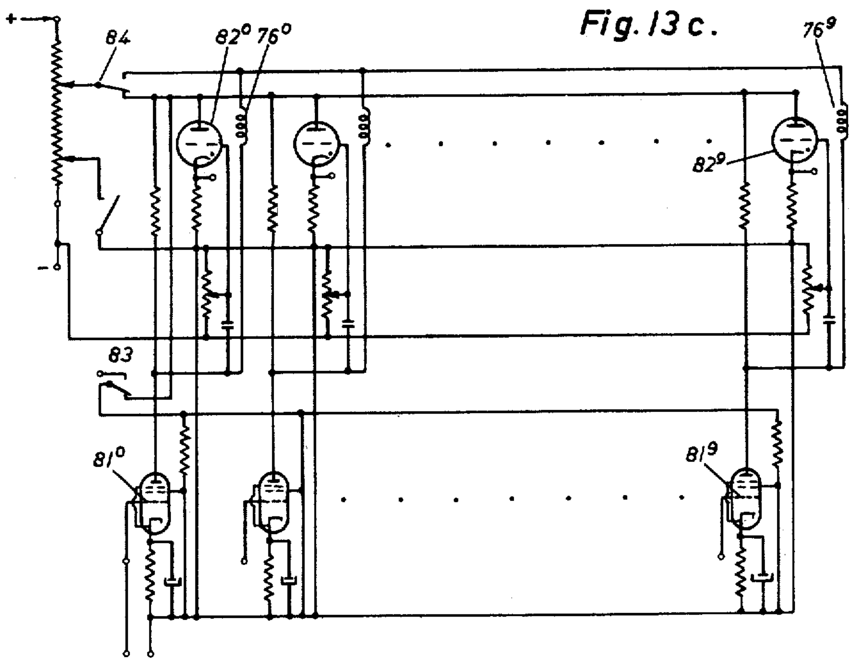
Figure 13D:
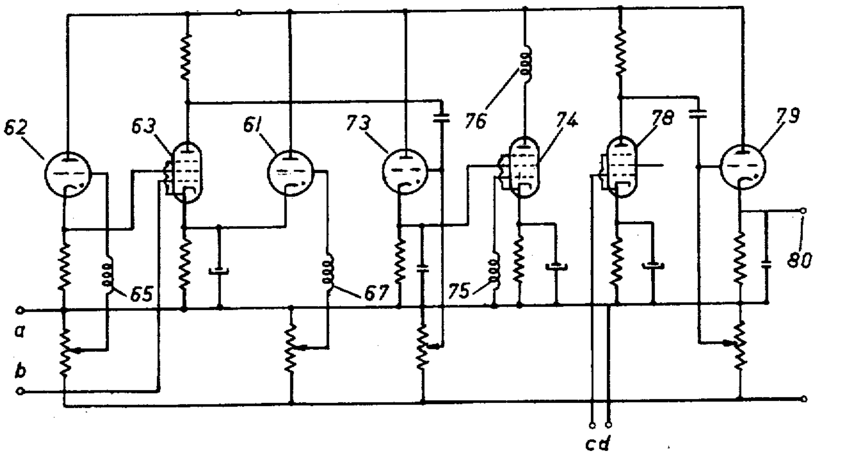
Figure 14:
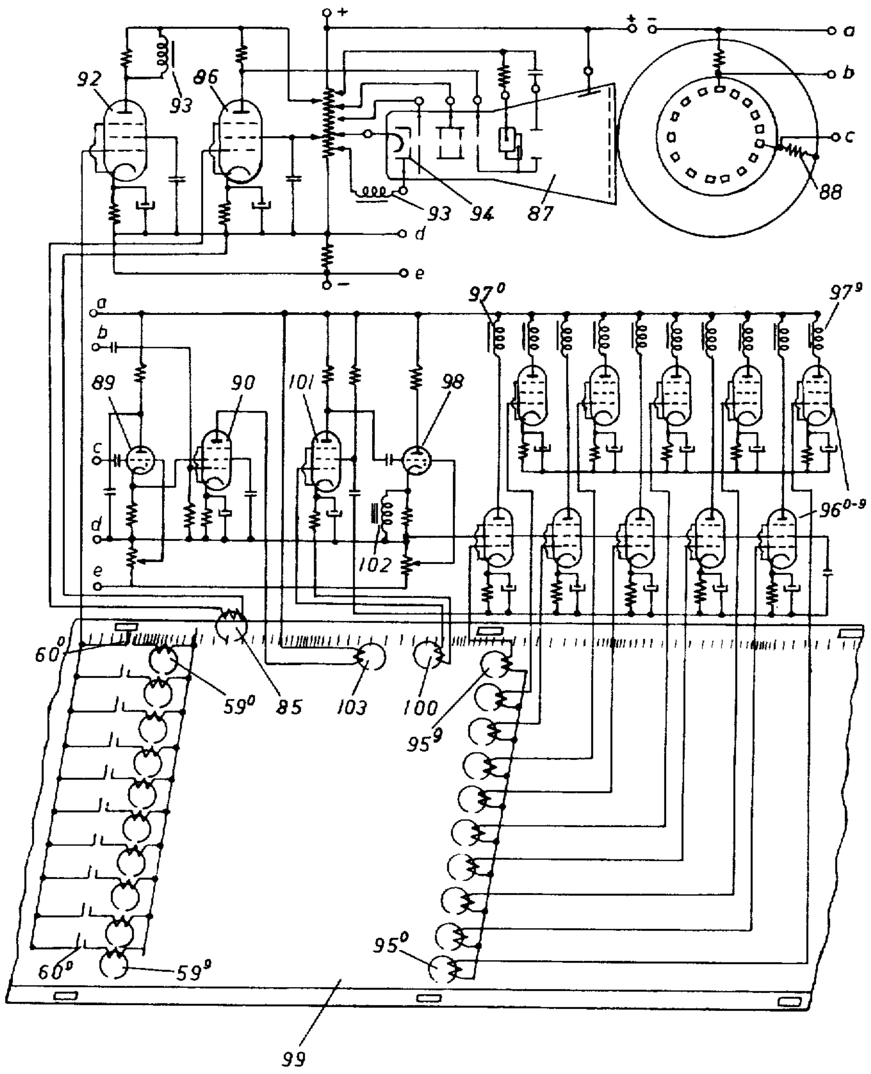

FIG. 13*a* is a perspective view of a selection-controlling distributor;

FIG. 13*b* illustrates the recording from one unity of a pre-mark signal determining the nature of the selection in a succeeding unity;

FIGS. 13*c* and 13*d* are wiring diagrams illustrating how the transfer of signals may be effected; and FIG. 14 is a more detailed diagram of an alternative arrangement.

Figure 1:
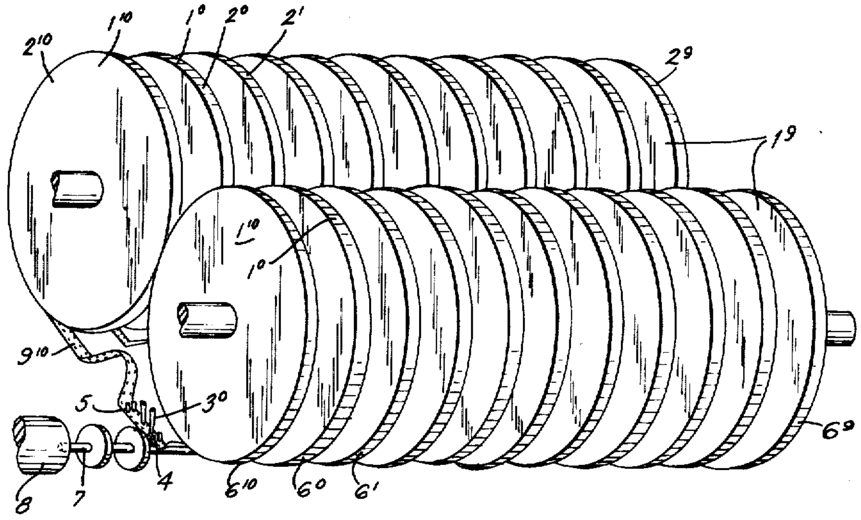
FIG. 1 is a perspective view of the main parts of a multi-tape sorting machine (in the specific use a ten-tape sorter) in which the tapes pass from reels in one side-by-side assembly to reels in another similar assembly.

FIG. 1 shows in diagrammatic perspective the main parts of a multi-tape sorting mechanism. It comprises eleven separately operating tape systems 1$^{10}$ and 1$^{0-9}$ for the successive step-wise sensing and recording of signals on sorting tapes. Each tape system comprises, respectively, the reel 2$^{0-10}$ from which the tape is uncoiled, the sensing head system, e.g. 3$^{10}$ by which the tape, e.g. 9$^{10}$ is sensed, the tape feeding system 4 with stop teeth 5 (compare FIG. 10) and the reel 6$^{0-10}$, respectively for rewinding the tape. The sensing and the transport systems are operated in dependence on the movement of the main shaft 7 driven by the motor 8. In the drawing an input system 1$^{10}$ is shown at the front of the assembly followed by the system 1$^{0}$ to 1$^{9}$ in succession.

The multi-tape sorter according to the invention is suitable to replace the mechanical sorting of punched cards into boxes, by replacing a mechanical sorting of marked record means by the simple electric sorting of the signals themselves onto, e.g. ten tapes.

For a better understanding, the multi-tape sorter is compared in the following with the function of the known punched card sorters with their boxes. The successively step-wise operated sections of tape 9$^{10}$ each containing a unit of information are comparable to the punched cards which are fed through one slot of the punched card feeding mechanism of the sorter.

Figure 10:
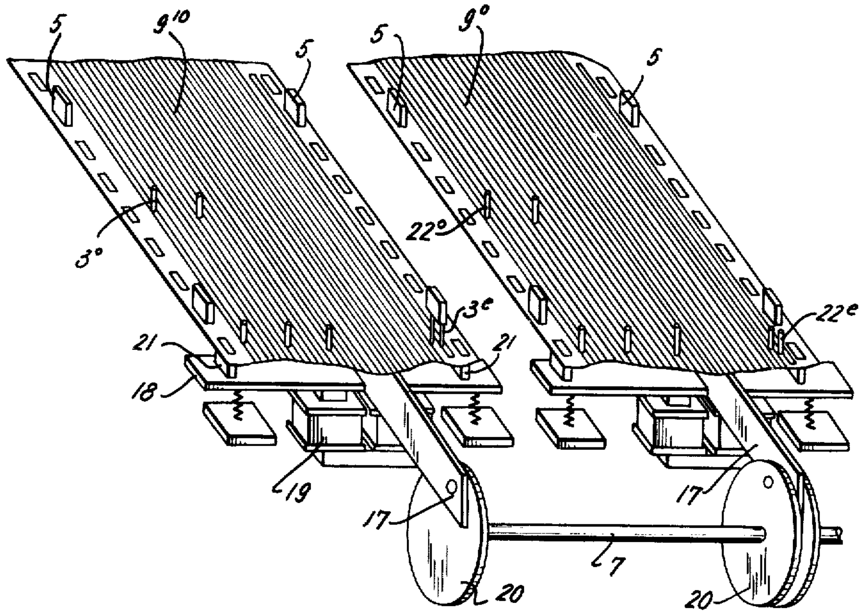
FIG. 10 is a fragmentary perspective view of an alternative form of tape-transporting means.

The tapes movable between the pairs of reels 2$^{0-10}$ and 6$^{0-10}$, respectively, can be compared with the mechanical boxes of a punched card sorter, into which the punched cards are sorted in dependence of which hole is sensed by the sensing brush within the column selected for sorting. But there is a great difference between the two mechanisms. In the mechanically or electro-mechanically operated punched card sorters the sensed and fed punched cards are mechanically fed with all their contents of information in the form of punched holes to one or other of the sorting boxes 0–9. In the multi-tape sorter according to this invention no mechanical sorting of mechanical cards into boxes takes place. In this case the signals of the sensed "unit" of the successively stepwise fed tape 9$^{10}$ themselves are electronically sensed and transferred to that one of the sorting tapes 9$^{0-9}$ which corresponds to a selected sensed sorting digit value within the selected transverse row of tape 9$^{10}$ the sensing and stepwise transport means for which have been set forth in detail in my copending application Serial No. 498,048, filed March 30, 1955, FIGS. 3–8, and are illustrated in FIGS. 3 and 10 of the accompanying drawings.

The equivalents of the mechanical filling up of the sorting boxes of a punched card sorter are the stepwise operating tapes moved between the tape reels 2$^{0-9}$ and 6$^{0-9}$, respectively, of which that one in turn is moved on a step corresponding to one "unit" to which all the signals of the sensed "unit" of tape 9$^{10}$ have been transferred.

In FIG. 1 the original tape 9$^{10}$ or a duplicate of it is fed in a continued succession of steps from reel 2$^{10}$ to the reel 6$^{10}$. In parallel with these reels, ten further reels are arranged of which the second ones from the left 2$^{0}$ and 6$^{0}$ carry the tape to which those "units" of the "original" tape 9$^{10}$ are transferred which have in the selected transverse row a recorded digit value "zero" used as sorting signal. The third tape from the left, carried by the pair of reels 2$^{1}$ and 6$^{1}$ receives all the signals contained in those "units" of the original tape which have recorded in the selected transverse row the digit value "one," used as sorting signal and so on.

Figure 2:
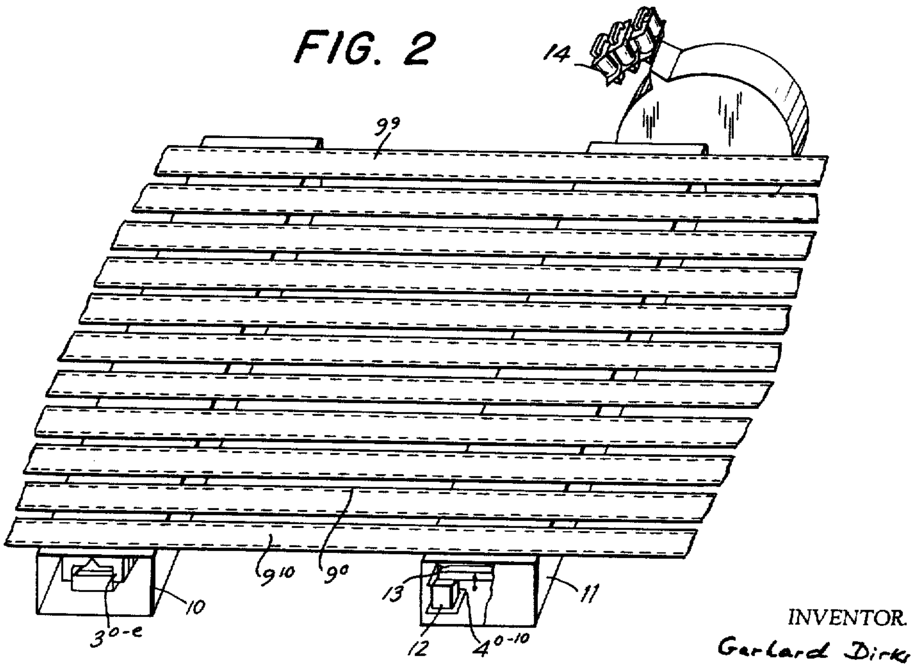
FIG. 2 is a fragmentary perspective view of the tapes and the tape-transporting means.
Figures 4, 5:
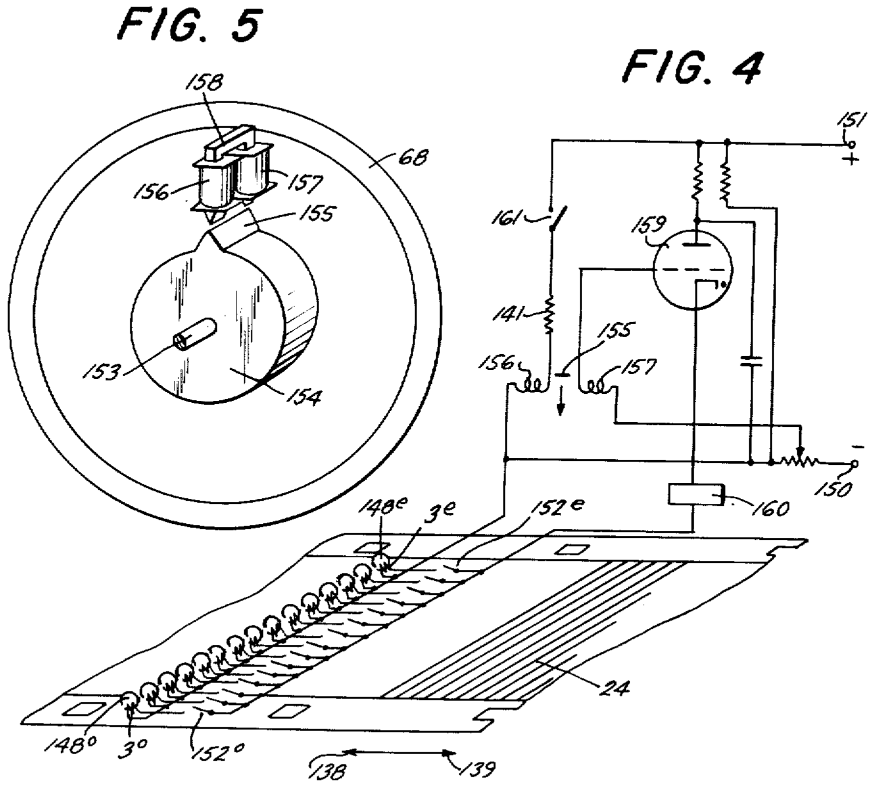
FIGS. 4 and 5 are perspective views of a distributor for the selecting of signals to be transferred.
Figure 3:
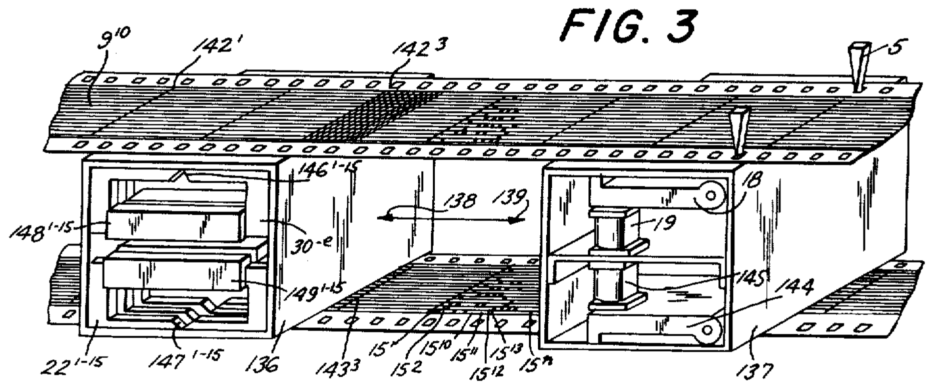
FIG. 3 is a more detailed perspective view of the tape-transporting and signal sensing and recording means.
Figure 6:
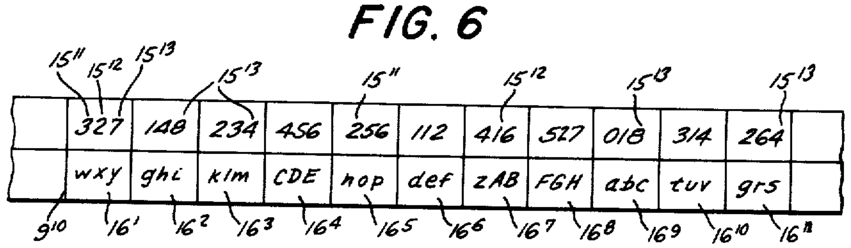
FIGS. 6 to 9 are diagrams illustrating successive stages in a sorting process.

The tapes and the signal head systems $3^{0-e}$ (of which only $3^0$ is visible in FIG. 1) as well as the tape feeding systems $4^{0-10}$ are shown enlarged in FIGS. 2 and 3. The mechanism may be understood as a manifold signal head and transport mechanism of the kind shown in my copending application Serial No. 498,048, filed March 30, 1955 (FIG. 1), and a selecting inductive switch as illustrated for example in FIGS. 5 and 13*a*, being for instance of the type described in my copending application No. 498,045, filed March 30, 1955 (FIGS. 3 and 4). The signal head systems $3^0$-$3^e$ are arranged in parallel within the support bar 10 and the transport mechanism $4^{0-10}$ within the support bar 11. The control magnets 12 allow of an engagement of the tape feeding levers 13 with the transport holes of a tape only if the signals of one "unit" have been recorded on that particular tape in dependence on the corresponding sorting signal recorded in that selected transverse row of the tape $9^{10}$ which contains with the respective "unit" the selected digit value constituting the sorting signal. The selecting of transverse rows respectively associated with different order positions is effected by the selecting mechanism known from the said copending application Serial No. 498,045.

Figure 11:
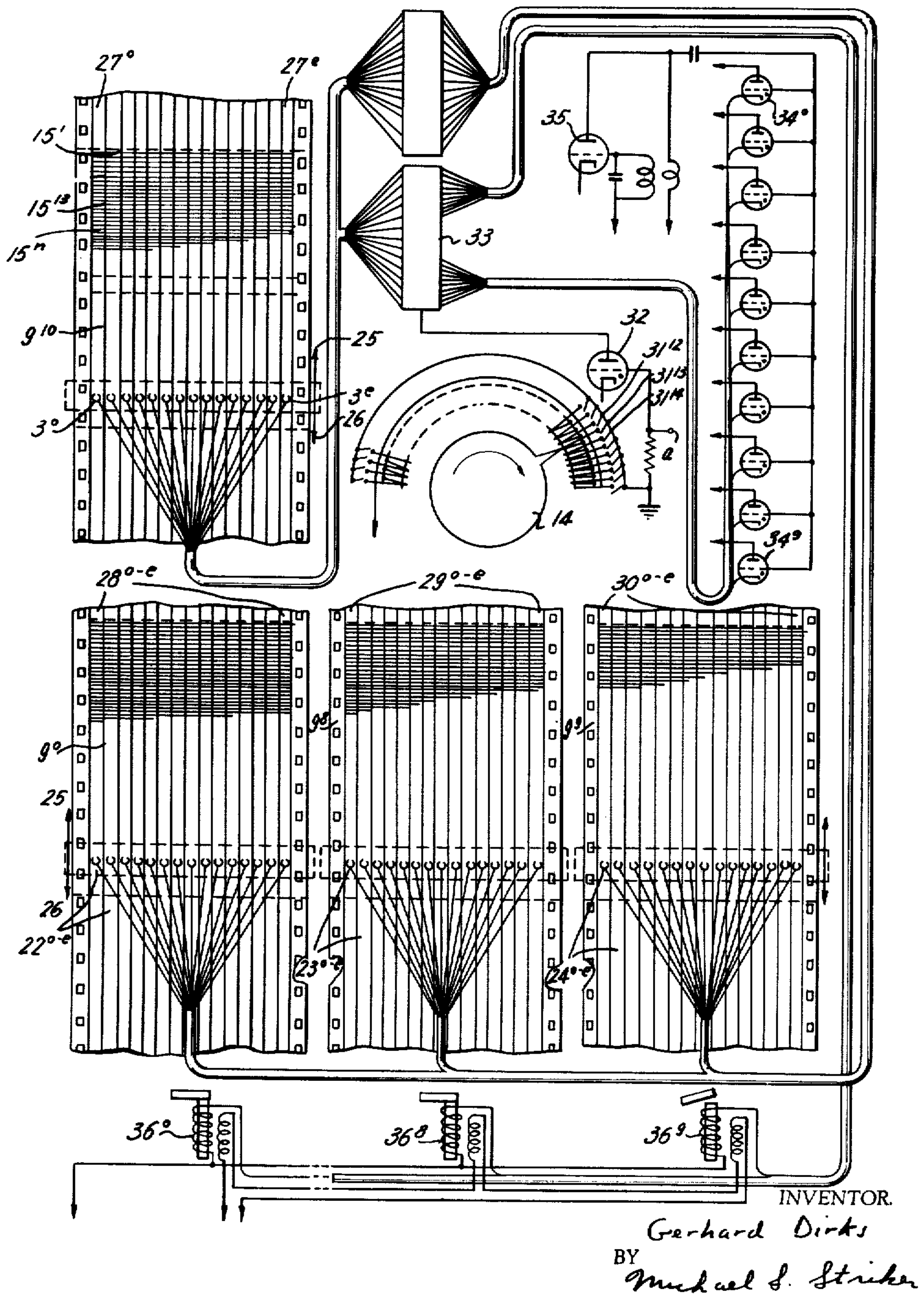
FIG. 11 is a diagrammatic representation of an electrical circuit for effecting signal sorting with a multi-tape sorter.

Briefly, selection is effected by an inductive distributor as shown in FIGS. 4 and 5 in which a sensed signal operates to energize an input winding 156 of a magnetizable core 158. Where the magnetic circuit is completed by the passage of a yoke 155, an output winding 157 delivers an impulse to ignite a gas discharge valve 159 thereby operating a relay 160. The yoke is driven in synchronism with the transport mechanism deriving its power from the motor 8 of FIG. 1. The selection of a particular transverse row timing is effected by the setting of the mounting ring 68 (FIGS. 5 and 13*a*) or as shown in FIG. 11 by switching in a particular one of a plurality of such windings, e.g. $31^{13}$ carried by cores fixed in position.

The principle of the sorting process will be explained more fully by considering a sorting procedure as represented in the sorting diagrams of FIGS. 6–9.

At first a duplicate of the original tape is produced, containing "unit" sections each consisting of a group of transverse rows, e.g. 80 to 150 rows, including those signals within such "unit" which are selectively used as the sorting signals. The signals may symbolize digit values or type characters. The consecutive "units" $16^1$, $16^2$ . . . $16^n$ arranged on the tape $9^{10}$ originally carry information recordings in an irregular sequence (327, 148, 234, 456, etc. in FIG. 6). They are to be sorted into a numerical or alphabetical sequence by selecting individual digits, e.g. 7, 2, 3 from these transverse rows as sorting signals, beginning with the relatively lowest order $15^{13}$ and ending with the highest order $15^{11}$ thereof. Each "unit" thus contains within its recorded information, sorting signals which may be digit values and/or characters in any of its rows and may be selected as desired, sorting to be effected on the basis of the selected sorting signals in order sequence.

In FIGS. 6–9, for the sake of explanation, the data in rows 11–13 used as sorting signals are indicated by digits, while the contents of all the other rows 1–10 and 14–80 of the "units" are represented by letters (*wxy, ghi, klm,* etc.).

The sorting process will now be described for three passages of the original or master tape $9^{10}$, such number of passages corresponding to the chosen number of digit (or character) recordings used as sorting marks. At the first sorting passage, the signals representing all the data shown in FIG. 6 by digit values and type characters of a "unit" are transferred respectively to those ones of the ten further tapes $9^{0-9}$ which in turn correspond to the sensed digit value signal used as sorting signals within the first order position, e.g. in row 13, i.e. one of the digits in position $15^{13}$.

The transverse rows $15^{11}$, $15^{12}$ and $15^{13}$ contain in the examples the hundreds, tens and units digit respectively. The first "unit" $16^1$ of the "units" $16^{1-n}$ which includes in row 13 the sorting signal 7 ($15^{13}$) is transferred to tape $9^7$ (FIG. 7), with all the signals of that "unit" $16^1$, comprising for instance the symbolized signals for "*wxy,*" and including also "327." The second "unit" $16^2$ with the sorting signal 8 ($15^{13}$) is transferred to tape $9^8$ (FIG. 7), with all the signals of that "unit" $16^2$, comprising, e.g. the symbolized signal for "*ghi*" and including also 148; the third "unit" $16^3$ with the sorting signal 4 ($15^{13}$) to tape $9^4$ (FIG. 7) with the signals for "*klm*" and including "234," and so on.

Figure 7:
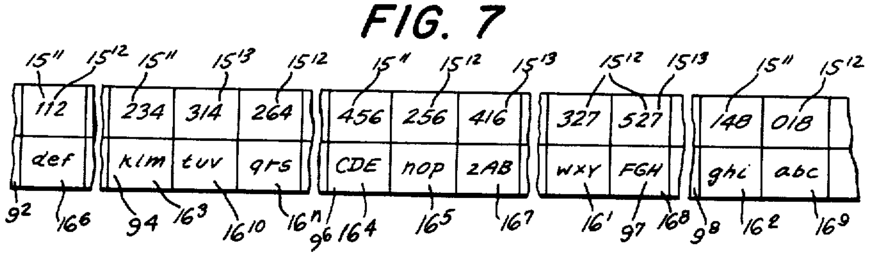

FIG. 7 illustrates portion of tapes $9^2$, $9^4$, $9^6$, $9^7$ and $9^8$ with signals transferred by the first passage, i.e. using sorting signals in row $15^{13}$.

It is to be understood that the signals within the tape are in this example arranged along the transverse row in the well known code used for I.B.M. cards, i.e. one position for each value so that each value is sensed by a selected head. Thus the "unit" $16^1$ must be thought of as having signals selected as sorting signals recorded in the respective transverse rows, and specifically in rows $15^{11}$–$15^{13}$, namely in row $15^{11}$ a "3," in row $15^{12}$ a "2" and in row $15^{13}$ a "7." The signals of the further information as indicated symbolically by "*wxy*" would be marked within the transverse rows, for instance $15^{1-10}$ and $15^{14-n}$.

After the first sorting passage of tape $9^{10}$, as shown in FIG. 7:

- Tape $9^0$ comprises no signals at all as there was no sorting digit "0" in column $15^{13}$ of any units $16^{1-n}$, and is therefore not shown;
- Tape $9^1$ comprises no signals at all as there was no sorting digit "1" in column $15^{13}$ of any units $16^{1-n}$, and is therefore not shown;
- Tape $9^2$ comprises all the signals of all the units $16^{1-n}$ having in column $15^{13}$ the sorting digit value "2," in this case one unit, namely the unit $16^6$;
- Tape $9^3$ comprises no signals at all, and is therefore not shown;
- Tape $9^4$ comprises all the signals of all the units $16^{1-n}$ having the sorting digit "4" in column $15^{13}$, namely units $16_3$, $16^{10}$, $16^n$;
- Tape $9^5$ comprises no signals at all, and is not shown;
- Tape $9^6$ comprises all the signals of all the units $16^{1-n}$ having the sorting digit "6" in the column $15^{13}$, namely unit $16^4$, $16^5$, $16^7$;
- Tape $9^7$ comprises all the signals of all the units $16^{1-n}$ having the sorting digit "7" in column $15^{13}$, namely units $16^1$, $16^8$;
- Tape $9^8$ comprises all the signals of all the units $16^{1-n}$ having the sorting digit "8" in column $15^{13}$, namely units $16^2$, $16^9$;
- Tape $9^9$ comprises no signals at all, and is not shown.

Hereby, during the first sorting passage, the signals of the sensed units are completely transferred, both those used as sorting signals as well as the signals for characters and digit values for computing or the like, to each one of the tapes $9^0$–$9^9$ in a successive numerical (or alphabetical) sequence in dependence on the selected sorting signals, respectively, in transverse row $15^{13}$.

In a way comparable to that in which the heaps of punched cards of the different boxes of a card sorter would be placed one upon another, beginning with the heap in the box "zero," the signals on the tapes $9^0$–$9^9$ are retransferred to tape $9^{10}$, whereby the signals of the information "units" now on tapes $9^0$–$9^9$ are re-recorded on tape $9^{10}$ in the same sequence, from tape $9^9$ to $9^0$, as illustrated by FIG. 7. Before the recording of the signals retransferred from tapes $9^9$–$9^0$ to tape $9^{10}$ the preceding signals on that tape are, of course, erased in a conventional manner by erasing heads, likewise the signals in the stepwise moved tapes $9^0$—$9^9$ are erased after having been sensed for said retransfer of their recordings.

If punched cards had been sorted, they would have been laid upon each other in the mechanical sorting boxes corresponding to the tapes $9^{0-9}$. The stepwise moving tapes can therefore replace the expensive punched card sorting mechanism, if tapes are used on which can be recorded the information (digits or characters) in up to 80–150 rows per "unit" within at the most ⅕ of a second, and from which the recorded information can be erased for further use of the tapes, and if any signals of any one row may be selected as sorting signals and used as such within the same time period.

Figure 8:
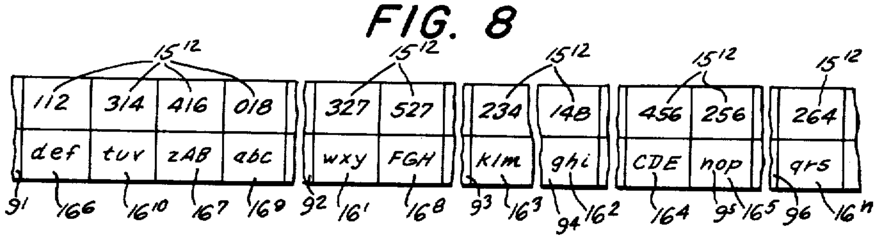

At the second sorting passage of the tape $9^{10}$ carrying now a sequence of "units" corresponding to FIG. 7, the sorting on the basis of a sorting signal in the row $15^{12}$, i.e. the tens digit, is effected and the "units" from tape $9^{10}$ are transferred, as shown in FIG. 8 (FIG. 8 illustrates portions of tapes $9^1$, $9^2$, $9^3$ and $9^5$ with the signals transferred by the second passage):

Tape $9^0$ comprises no signals because in no unit was there a sorting signal 0 in row $15^{12}$, and is therefore not shown;

Tape $9^1$ comprises the signals of all units in which in row $15^{12}$ there was a signal 1, namely units $16^6$, $16^{10}$, $16^7$ and $16^9$;

Tape $9^2$ comprises the signals of all units in which in row $15^{12}$ there was a signal 2, namely units $16^1$ and $16^8$, etc.

For completing the sorting process, the signals now on the tapes $9^0$–$9^9$ are again retransferred to tape $9^{10}$.

Figure 9:
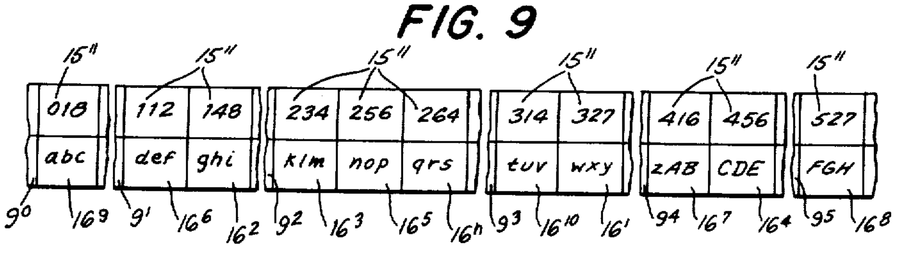

At the third sorting passage of the tape $9^{10}$ now carrying a sequenc of "units" as arranged in FIG. 8, according to FIG. 9 which illustrates portions of tapes $9^0$, $9^1$, $9^2$, $9^3$, $9^4$ and $9^5$ to which the retransferred recordings now on tape $9^{10}$ are distributed by using sorting signals from row $15^{11}$.

Tape $9^0$ contains the signals of all units having the signal 0 in row $15^{11}$, namely unit $16^9$;

Tape $9^1$ contains the signals of all units having the signal 1 in row $15^{11}$, namely units $16^6$ and $16^2$;

Tape $9^2$ contains the signals of all units having the signal 2 in row $15^{11}$, namely units $16^3$, $16^5$ and $16^{11}$;

Tape $9^3$ contains the signals of all units having the signal 3 in row $15^{11}$, namely units $16^{10}$, $16^1$.

As the stepwise feeding can take place up to a speed of fifty to a hundred units per second, the equivalent output of ten punched card sorting machines can be achieved, for the effect is the same as if a pile of 180,000 and more punched cards would have been sorted in an hour, and this is performed in one sorting passage by reference to sorting signals in one selected transverse row.

By "passage" is understood, comparable to the sorting of punched cards, the sorting of "units" of the tape, under control of selected sorting signals, for example 0–9 (or 0–12), representing digits or characters, existing within one selected transverse row, i.e. a signal in a selected order position, in this sort of signal recording.

The transfer and retransfer, including the erasing of previous recordings in conventional manner, of the signals can be automatically controlled so that, with the great recording capacity of the tape reel system, reels need scarcely be changed during ordinary operation of the system.

Referring to FIG. 10, illustrating by way of example a two-tape system, there is shown the manner of step-wise feeding and the sensing and recording of one or more tapes controlled independently of each other. From the original tapes $9^0$, which is fed stepwise, a transfer of signals is effected at the first sorting passage, e.g. to the second tape $9^0$ only when the first tape contains, in a selected transverse row the digit value "0." At the same time, when such a transfer has taken place, the second tape $9^0$ is moved on one step. Unlike FIG. 3 the electromagnets 19 are fixed. The shaft 7 continuously rotates each of the discs 20 which by links 17 transmits a reciprocating motion to the cross bar 18 carrying feed pawls 21, so that the tape is advanced in one half cycle and returned unless these pawls are withdrawn by energization of magnet coil 19 in the next half cycle. The up and down motion of the bar 18 is transmitted to the locating pawls 5 by a pivoted link, not shown, so that these hold the tape and by reason of their sloping edge (as seen in FIG. 3) effects a definite positioning of the tape. The sensing and recording is effected by means of stationary sensing, recording and erasing heads $3^0$, operating on the moving tape $3^e$.

During the continued consecutive stepping forwards of the first tape $9^{10}$, a transfer of the sensed signals from its sensing head coils $3^{0-e}$ to the recording heads $22^{0-e}$ of the next tape $9^0$ can be effected, as described above, only if in a selected transverse row the digit value "0" is contained and used as a sorting signal in the first sorting passage.

FIG. 11 is, as a supplement to FIGS. 1–10, a diagram of a wiring scheme illustrating the basic principle of a sorting mechanism with ten sorting tapes $9^{0-9}$. This basic diagram is subject to modifications as described below. Between the sets of sensing heads $3^{0-e}$ and recording heads $22^{0-e}$, $23^{0-e}$ and $24^{0-e}$ and the respective tapes $9^{10}$, $9^0$, $9^8$, $9^9$, there is a relative movement in the direction of the arrows 25—26. The said relative movement may be a movement of signal heads over a stationary tape, or a movement of a tape past stationary signal heads. During the movement 25, the magnetic signals within the different tracks $27^{0-e}$ of tape $9^{10}$ are transferred to the recording head systems $22^{0-e}$, $2380^{-e}$, $2480^{-e}$, etc., so that at the end of this movement 25 all the tapes contain the same signals at the respectively corresponding points of tracks $28^{0-e}$, $29^{0-e}$ and $30^{0-e}$, and so on, in the corresponding transverse rows $15'^{-n}$ as indicated, e.g. on tape $9^{10}$. During this movement 25 it has also a particular digit value among those marked by magnetic signals within a selected order, i.e. transverse row in order position "13" (i.e. in row $15^{13}$) is applied as a sorting signal. The distributor 14 has fixed cores one for each transverse row in a unity of tape. That one of switches 31 is closed which renders the respective core effective to detect the signal sensed at the associated transverse row. Thus switch $31^{13}$ selects sensing transverse row $15^{13}$ by operation of gas valve 32 for operating that one of the valves $34^0$ to $34^9$ which corresponds to the digit sensed. Thus it is effected that the amplifier 33 containing ten channels (tubes) is rendered operative between valve 32 and the tubes $34^0$–$34^9$ only for the interval of the passing of the sensing heads $3^{0-e}$ above order position "13," namely transverse row $15^{13}$, and that only that one of the tubes $34^{0-9}$ is ignited which is assigned to control a digit value signal corresponding to the respective magnetic signals within the selected order or transverse row, i.e. "13" as described below.

It should be borne in mind that the basic arrangement according to this invention can be modified, partly by variations of certain auxiliary circuits and means, to carry out the sorting operation in one of two ways. In the first case, the information contained in all of the "units" on the original tape are transferred to all the sorting tapes, respectively, with following selective erasing of the transferred "units" from those sorting tapes which have no relation to the previously selected sorting signal; in the second case, the selected sorting signal is pre-sensed before the respective "unit" is sensed and transferred, and under the control of the pre-sensed sorting signal the transfer of the subsequently sensed "unit" is selected and the transfer effected to that tape which has the correct relation with the selected sorting signal.

As these tubes $34^{0-9}$ are connected to control the amplification of the erasing high frequency supplied by the oscillator 35 (as will be described for oscillator 49 and tubes $56^{0-9}$ in FIG. 12), all those recordings on the tapes $9^{0-9}$ are erased during the backward movement 26 which do not correspond as to the sorting signal used from among those signals which are recorded in row $15^{13}$ with number of the tape ($9^0$, $9^1$, $9^9$, etc.) to which they have been transferred. In this case, the pulse "0" being contained within row "13" on track $27^0$ of tape $9^{10}$, all the signals transferred to the tapes $9^{1-9}$ during the forward movement 25, will be erased during the backward movement 26, whereas only the recording of the respective "unit" on tape remains, because tube $34^0$ will be excited during the forward movement to prevent erasing of the record on tape $9^0$, due to remaining excited during the backward movement 26. The excited tubes $34^{0-9}$ are extinguished by disconnection of the power supply or other conventional means. During this backward movement, also tape $9^0$ will be fed a step corresponding to one "unit" while the tapes $9^{1-9}$ remain stationary and are erased (FIG. 3) as far as the just-transferred "units" are concerned. Thus, an effective sorting transfer took place only from tape $9^{10}$ to tape $9^0$ in conformity with the selected sorting signal "0" existing within order "13," namely in column $15^{13}$.

By the excitation of amplifier 33, the relay $36^0$ has caused the advance of the tape $9^0$ by one step, while the same excitation has blocked the circuit for the erasing frequency from tube 35 to the signal heads $22^{0-e}$ on the tape $9^0$. In a different situation, the relays $36^{1-4}$ (only $36^8$ and $36^9$ being shown) would act analogously.

Figure 12:
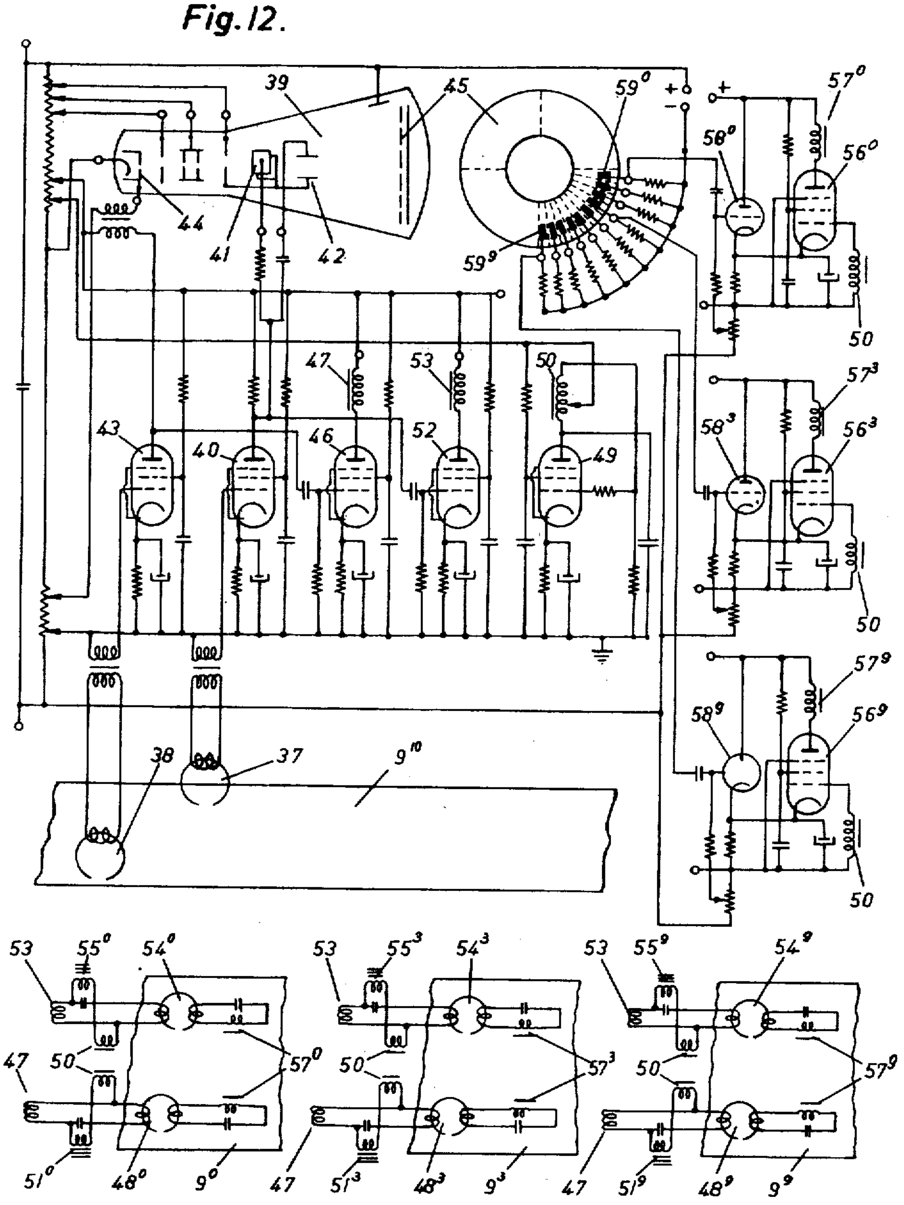
FIG. 12 is a more detailed diagram of an alternative circuit.

FIG. 12 differs from the arrangement already described by the fact that instead of parallel sensing heads $3^{0-e}$ and parallel recording heads $22^{0-e}$, $23^{0-e}$, $24^{0-e}$, etc., a serial arrangement is shown for sensing and recording and includes the sensing head 37 for a synchronizing track and the sensing head 38 for sensing the sequence of signals indicating the numerical values (digit and denomination value) in series, in the sequence of order positions within each "unit." The sensing head 37 for the synchronizing track controls in this embodiment an electronic distributing means 39 (a rotating cathode ray tube) by means of the sensed control frequency. The electronic distributor 39 is controlled as to the rotation of its cathode ray by a control frequency on the tape recorded as a line wave frequency. This control frequency is sensed by signal head 37 and amplified by pentode 40, controlling the two deflecting plate systems 41, 42 of the cathode ray tube 39 the voltages of such plates being shifted relatively to each other by 90°, effecting a rotation of the cathode ray.

The digit value signals are sensed by means of the sensing head 38, amplified by the pentode 43 and conducted to the control electrode 44 of the cathode ray distributor 39, if the pentode 43 is conductive. The conductivity of the pentode 43 is effected by means of the discharge tube 32 (FIG. 11) acting on the screen grid of pentode 43 only during the sensing of that column which ignites the discharge tube 32 by the exciting of its control grid by a pulse from the row-selecting means, in this case the inductive distributor 14 and via a closed switch, e.g. switch $31^{13}$. After the row has been selected the sensing head 38 senses the signals in the respective row and these signals are transfered effectively to the tapes $9^0$–$9^9$ under the control of the electronic distributor 39.

A second rotating system may also be used within this cathode ray distributor 39, its rotation being controlled by means of a control frequency, either taken directly from the tape or synchronized by synchronizing signals during the rotation of the cathode ray of the first system over screen 45, this ray rotating once for every row and the ray of the second system rotating in synchronism with the first ray but only for one "unit" for each rotation of the first ray. By this means, row selecting is made possible. Finally, a selecting of the desired row can be effected, if there are holes or notches provided on the edges of the tape, so that the row at which the exciting of discharge tube 32 (FIG. 11) is to take place, can be selected by a displacement of one or more signal heads to an extent equal to the distance between the selected row and the zero row. By this means a local selection at a definite time instant can be made instead of a time selection at varying time instants. This is described in more detail below in connection with FIG. 13*b*.

Instead of the electronic or inductive distributors, a contact distributor or other distributor may be adopted according to the degree of efficiency required, and to the speed of operation.

Via pentodes 43 and 46 and transformer 47 (the primary and secondaries being shown separated) the digit value signals are transferred at first to the recording coils $48^{0-9}$ (see tapes $9^0$, $9^3$ and $9^9$) of all the tapes $9^0$–$9^9$. The coils $48^{0-9}$ are, according to the high frequency pre-magnetizing and erasing, pre-magnetized from the oscillating pentode 49 to which the primary of transformer 50, having its secondaries connected in parallel to the respective recording coils $48^{0-9}$, is coupled. The resonant circuits $51^{0-9}$ each consist of a self-induction and parallel capacitor, tuned to the oscillating frequency from the transformer 50. The pulses of the digit values, sensed by means of the sensing head 38 and amplified by pentodes 43 and 46 conducted via the transformer 47, are tuned only to a special frequency. Thus, the pulses sensed by means of sensing head 38 are transferred in the one movement of the heads 38 and 37 relatively to the tape $9^{10}$ to all the tapes $9^{0-9}$. Moreover, the control frequency is transferred from sensing coil 37 via pentode 40 to pentode 52 and the transformer 53 (its primary and secondaries being shown separated) to the respective recording heads $54^{0-9}$. The pre-magnetizing from the oscillating pentode 49 via transformer 50 is effected in the same way as described above, since the resonant circuits $55^{0-9}$, consisting of a capacitor and a self-induction coil are used as described above. The high frequency oscillations in winding 50 within the plate circuit of pentode 49 is transferred via separate secondary windings to the respective pentodes $56^{0-9}$, so that the transformers $57^{0-9}$ (their primaries and secondaries being shown separated) may produce in the signal heads $48^{0-9}$ and $54^{0-9}$, respectively, the erasing frequency, which is switched in by conventional means, not shown, during the backward movement of the signal heads over the tape, if a reciprocating relative movement between signal heads and tape is used and no preceding selecting of sorting signals by a preceding signal head has been made, as described below with reference to FIGS. 13 and 14.

By this means all those signals sensed by sensing head 38 and transferred to tapes $9^0$–$9^9$ by signal heads $48^{0-9}$ and $54^{0-9}$, are erased by those of the signal heads $48^{0-9}$ and $54^{0-9}$, of which the corresponding discharge tube $58^{0-9}$ (corresponding to the tubes $34^{0-9}$, FIG. 11) is not ignited while the coordinated pentodes $56^{0-9}$ are conductive. If a discharge tube $58^{0-9}$ is ignited, the corresponding pentode $56^{0-9}$ is non conductive, because when a discharge tube is excited the cathode of the coordinated pentodes $56^{0-9}$ becomes positive relative to its suppressor grid. Thus, only to that one of the ten tapes $9^0$ to $9^9$ which corresponds to the digit value in the selected row containing the sorting signal being used will the digit value signals sensed by means of sensing head 38 be transferred and remain recorded, and not then erased. The ignition of the discharge tube $58^{0-9}$ is controlled in dependence on the digit value or character signals in the selected row containing the sorting signal used via sensing head 38, pentode 43, control grid 44 of cathode ray tube 39 and the switching field $59^{0-9}$ of the screen 45.

Instead of operating the sorting means with ten tapes, and transferring all the signals of digit values to the recording heads of all the tapes, and erasing during the backward movement of the sensing heads all those recordings which do not correspond to the digit value of the sorting signal in a selected row, a direct transfer of signals may be made but in the latter case it would have to be discovered and recorded in an advance sensing to which of the tapes the pulses had to be transferred, as only after the sensing of the sorting signals of the respective selected row is it known to which of the tapes $9^0$ to $9^9$ the digit value impulses are to be transferred and caused to remain recorded therein.

The ignition of the gas discharge tubes $58^{0-9}$ via the cathode ray distributor 39, with switching fields $59^{0-9}$ corresponds to the arrangement described in detail in my copending application Serial No. 498,048, filed March 30, 1955 (FIGS. 7 and 8).

In the devices described up to now the sorting was effected by the transfer of "units" to a set of sorting tapes by transfers which "have been made effective" either during the movement of the tape after the signals have been sensed from a stationary tape, or transferring all signals to all tapes and sensing a sorting signal, and during the movement of the tape, erasing all those transferred signals not selected by the sorting signal.

The transfer can be effected in such a way that in a respectively preceding sensing process the digit value of a sorting signal in a selected column is sensed and then used for sorting in the subsequent sensing process. In dependence on the result of this selection, the whole "unit" is sensed in a second sensing process and in a given case transferred on to the selected sorting tape. It is in this process possible to effect the sorting by two sensing processes, which are effected simultaneously, of which the one is carried out in an area offset, in the amount of one "unit," ahead of the area of the other. On the other hand, the sensing processes can be effected by the same signal head successively after each other. The advance sorting signals for effecting the sorting transfer in the subsequent sensing cycle may be either stored in relay or electronic tube storages or the like, or on the tapes themselves.

Such a sorting device, which effects the sorting process by the transfer of information from a primary tape $9^{10}$ by means of two sensing processes is described in the following with reference to FIGS. 13*a*–13*d*.

In FIG. 13*b* the sensing heads $59^{0-9}$ are shown, which introduce signals via the switches $60^{0-9}$ in a selectable circuit via the connection circuits *a*, *b*, to the electronic selecting gate comprising the discharge tubes 61 and 62 and the pentode 63 of FIG. 13*d*.

The transverse row on tape $9^{10}$ containing the sorting signals according to which the sorting is to be effected, is selected by means of the coils 64/65 and 66/67 by a rotational adjustment thereof within the ring 68. The ring 68 carries a scale, as shown, which indicates by reference to the position of said coils in which row the coils 64/65 and 66/67 are to be effective. Discs 69 and 69*a* which are provided on the main shaft 71, have yokes or teeth 70 and 70*a*, respectively, the edges of which pass closely over the edged cores of the said coils 64/65 and 66/67, respectively. The shaft 71 may be driven from the shaft 7 of FIG. 1.

If the primary winding 64 of coil set 64/65 is excited by means of direct current, the gas discharge tube 62 is ignited upon the passing of the yoke 70 over the core of that coil, since the secondary winding 65 of this coil set is connected with the control grid of the gas discharge tube 62. The ignition of the gas discharge tube 62 effects conductivity of pentode 63, as the cathode resistance 72 of the gas discharge tube 62 delivers the screen grid voltage of the pentode 63 as a voltage drop.

After movement corresponding to the width of almost one row, the yoke 70*a* of disc 69*a* passes the core of the coils 66 and 67, and the gas discharge tube 61 is ignited as described above which renders the pentode non-conductive by making the cathode potential thereof positive in relation to the potential of the suppressor grid.

By way of introductory explanation, it may be mentioned that after a sorting row containing the sorting signal to be used has been selected, it must be ascertained which digit value (if any) to be used as a sorting signal is in the selected row, and such digit value must be recorded as a pre-mark for the next sorting cycle. This recording may be done either in an electronic storage, e.g. electronic tubes, or on the tape itself. The latter alternative is illustrated diagrammatically in FIG. 13*b*, and in further detail in FIG. 14, while the former is illustrated in FIG. 13*c*.

In FIG. 13*d* the circuit is shown in operative condition for the digit value 0, and for other digit values either an identical arrangement of recording means must be provided for each track or a single recording means could be moved from track to track successively for the successive digit values 0–9.

In the drawing, FIGS. 13*b*, *g*, the control grid of pentode 63 is connected only with that one of the sensing heads $59^{0-9}$, which is switched on via the corresponding switch $60^{0-9}$ (i.e. in the case shown the switch $60^0$) and only those signals can be made effective via the pentode 63, which correspond both to the selected row as determined by the position of the coils 64/65 and 66/67 and to the switched-on sensing head $59^{0-9}$ (i.e. in the case shown, signal head $59^0$).

If such a signal is sensed from a selected row, it ignites the gas discharge tube 73 via the pentode 63 (conductive only during the passing of this row) and renders conductive the pentode 74, the control grid of which is connected with secondary winding 75 (see FIG. 13*a*) while in the plate circuit of that pentode the recording coil 76 (FIG. 13*b*) is arranged.

By this means, a pre-mark is stored in the first or other initial row of the same "unit," indicating that the signals of this unit are to be transferred to sorting tape "0" ($9^0$) during the next following sensing and transfer cycle. In FIG. 13*b* the tape moves from left to right.

By means of this pre-marking for the effecting of a transfer, this transfer can be effected directly, without making first an ineffective transfer which later has to be erased. This pre-marking signal is sensed by means of the signal head 77, which is connected with the control grid of the pentode 78 via the connection circuits (FIGS. 13*b*, *d*) *c*, *d*. The amplified signal effects the ignition of gas discharge tube 79, opening respective switches connected to the respective cathode circuits at 80 determining whether a transfer of the signals of the particular "unit" to the respective shorting tapes (in this case tape $9^0$) is to take place or not.

Instead of having only one transfer possibility (i.e. to tape $9^0$) according to this diagram (showing only the principle of the arrangement) it must be understood that with a multi-tape sorter there may be for instance ten different transfer possibilities, say to sorting tapes $9^{0-9}$, any one of which can be selected as described above. In this case, of course, no switches $60^0$–9 are needed.

The selection as to the sorting tape to which a transfer of signals is to be made may then be controlled by a corresponding plurality (e.g. 10) of amplifier and relay circuits similar to the one shown in FIG. 13*d*, each comprising a pentode 78 and discharge tube 79. Such a plural arrangement having for instance ten selecting possibilities is shown in FIG. 13*c*, having the pentodes $81^{0-9}$ and discharge tubes $82^{0-9}$ (corresponding to pentode 78 and tube 79). The control grids of the pentodes $81^{0-9}$ may be influenced directly via the sensing head series $59^{0-9}$ without the intermediate switches $60^{0-9}$, the pentodes being conductive only during the passing of said sensing heads over the row selected by the means described above.

The selecting switch 83 shown symbolically in FIG. 13*c* is arranged to open the amplification circuits of the pentodes $81^{0-9}$ only at the selected respective time periods. Switch 84 may be used for extinguishing the discharge tubes $82^{0-9}$ after having been ignited, if switch 84 is moved from the position shown to its alternative position.

When the switch 84 is in its alternative position the selected signals amplified in pentodes $81^{0-9}$ may be recorded by the recording heads $76^{0-9}$ in another intermediate storage for instance in the appropriate position on the magnetic tape itself, without using the relay tubes $82^{0-9}$, if the sets of signal heads $59^{0-9}$, and $76^{0-9}$ are related to each other respectively at the appropriate row-spacing distance. Alternatively either one of said intermediate storage circuits, namely in tubes $82^{0-9}$ and by recording on the tape or other magnetic storage may be used.

In the shown position of the switch 84 the exciting of the gas discharge tubes is effected in dependence of the sorting pre-mark signal.

If instead of the inductive distributor 14 (FIG. 11) there is provided a cathode ray distributor 39 (FIG. 12) for the selection of the rows and/or digit values, an arrangement can be used according to switching diagram of FIG. 14. The sorting process itself is almost the same as has been described in connection with FIGS. 13*a–d*.

In the example illustrated, and in contrast to FIG. 13*b*, an additional sensing head 85 effects via the coordinated pentode 86 and a phase-shifting device the circular rotation of the cathode ray in the electronic distributor 87. The row containing the sorting signals according to which the sorting is to be effected, is indicated by the connection of the high-ohmic resistance 88, which may be one of a plurality thereof arranged for selection of the respective rows used for sorting and which ignites the gas discharge tube 89, when the sorting process is to take place. The gas discharge tube 89 renders the pentode 90 conductive, which obtains its screen grid voltage as a voltage drop at the cathode resistance of the discharge tube 89. The premarking signal itself, which indicates that a particular transfer is to be effected, and which is recorded by the recording head 103, will be released at the high-ohmic resistance 91. Only those of the signal heads $59^{0-9}$ can be made effective via the cathode ray distributor, which give signals on to the control grid of the pentode 92 via a closed switch $60^{0-9}$. Regarding this feature, compare the description of FIGS. 13*b* and 13*c*.

In the plate circuit of the pentode 92 is arranged the transformer 93, which transfers the signals to the control grid 94 of the cathode ray tube 87 and thereby controls the intensity of the cathode ray. A transfer to a second tape from the sensing heads $95^{0-9}$ via the coordinated pentodes $96^{0-9}$ to the recording heads $97^{0-9}$ of the other sorting tape is only effected, if at the beginning of the sensing of a "unit," the gas discharge tube 98 is ignited by pre-marking signals, which had been recorded on the tape 99 and sensed by the sensing head 100 and amplified by pentode 101.

After each sensing process of the tape 99 this tape is moved forwards a step corresponding to the length of one "unit" by means of the transport system described above. The tape to which the signals have been transferred is moved on a step corresponding to one "unit" as described above. The control of the transport system is also effected by the discharge tube 98.

As was the case with the arrangement of FIGS. 13*b* and 13*d*, there may be in this present arrangement also a plurality of transfer possibilities say to the sorting tapes $9^{0-9}$, any one of which can be selected. In this case the system comprising pentode 101 and relay tube 98 will be provided in a number (e.g. 10) equal to that of the sorting tapes $9^{0-9}$, as was described in connection with FIG. 13*c*.

Further, the respective pre-marking signals 0–9 may be arranged in an additional track, e.g. a fourteenth track on which the recording and sensing heads 103 and 100 may operate, the recording of such signals being effected serially in different localities along such line or track, relatively for example to synchronizing signals in the line or track sensed by signal head 85 correspondingly located, and by sensing and recording means such as are described with reference to FIG. 12.

In the same way the series of signal heads $59^{0-9}$ and $95^{0-9}$ may be replaced each by one signal head if an electronic distributor means or the like is used, operating in dependence on timing signals in the synchronizing track sensed by signal head 85, related to fixed points on the tape.

I claim:

1. Apparatus for sorting information data recorded by spot magnetization of a magnetizable record carrier in the form of distinct data units each containing a plurality of character-representing data elements differentiated by their relative positions within the area occupied by the respective unit, each character-representing data element of a distinct data unit representing a different denominational order of said distinct data unit, comprising, in combination, first magnetizable record carrier means carrying a sequence of said data units erasably recorded thereon in areas of respectively corresponding unit length; first sensing means for sensing said data elements from said recorded data units, and for recording such data elements on said first record carrier means in replacement of previously recorded data elements; a plurality of second magnetizable record carrier means capable of having data erasably recorded thereon, said second record carrier means being respectively assigned to different sorting classifications; second sensing means for sensing recording data elements from said second record carrier means and for recording such data elements on said second record carrier means in replacement of previously recorded data elements; first and second transportation means for respectively independently moving said first and second record carrier means relatively to said first and second sensing means, respectively, in steps corresponding to said respective unit lengths of recording areas; control storage means for storing character-representing data elements; transfer means connecting said first sensing means with said second sensing means for selectively transferring character-representing data elements representing sorting classification data from said first record carrier means to said control storage means, said transfer means including controllable gate means for permitting the recording on at least one of said first and second record carrier means of data units sensed from the other of said first and second record carrier means, respectively, and for selectively transferring a first control signal stored in said control storage means from said control storage means to said second transportation means for controlling the operation of the latter; and selective control means for controlling the gate means of said transfer means by applying thereto a second control signal at a selected instant when any desired one of said character-representing data elements of any of the different denominational orders of said distinct data unit selected to serve as a classification data is sensed by said first sensing means from said first record carrier means, said selective control means including means for advancing said selective control means in synchronism with the sensing of consecutive ones of said character-representing data elements from said first record carrier, and setting means for causing said selective control means to produce said second control signal at said selected instant.

2. Apparatus for sorting information data recorded by spot magnetization of a magnetizable record carrier in the form of distinct data units each containing a plurality of character-representing data elements differentiated by their relative positions within the area occupied by the respective unit, each character-representing data element of a distinct data unit representing a different denominational order of said distinct data unit, comprising, in combination, first magnetizable record carrier means carrying a sequence of said data units erasably recorded thereon in areas of respectively corresponding unit length; first sensing means for sensing said data elements from said recorded data units, and for recording such data elements on said first record carrier means in replacement of previously recorded data elements; a plurality of second magnetizable record carrier means capable of having data erasably recorded thereon, said second record carrier being respectively assigned to different sorting classifications; second sensing means for sensing recorded data elements from said second record carrier means and for recording such data elements on said second record carrier means in replacement of previously recorded data elements; first and second transportation for respectively independently moving said first and second record carrier means relatively to said first and second sensing means, respectively, in steps corresponding to said respective unit lengths of recording areas; control storage means for storing character-representing data elements; transfer means connecting said first sensing means with said second sensing means for selectively transferring in an initial transfer operation character-representing data elements representing sorting classification data from said first record carrier means to said control storage means, said transfer means including controllable gate means for permitting in a subsequent transfer operation the recording on said second record carrier means of data units sensed from said first record carrier means, and for selectively transferring a first control signal stored in said control storage means from said control storage means to said second transportation means for controlling the operation of the latter; and selective control means for controlling the gate means of said transfer means by applying thereto a second control signal at a selected instant when any desired one of said character-representing data elements of any of the different denominational orders of said distinct data unit selected to serve as a classification data is sensed by said first sensing means from said first record carrier means, said selective control means including means for advancing said selective control means in synchronism with the sensing of consecutive ones of said character-representing data elements from said first record character, and setting means for causing said selective control means to produce said second control signal at said selected instant.

3. Apparatus for sorting information data recorded by spot magnetization of a magnetizable record carrier in the form of distinct data units each containing a plurality of character-representing data elements differentiated by their relative positions within the area occupied by the respective unit, each character-representing data element of a distinct data unit representing a different denominational order of said distinct data unit, comprising, in combination, first magnetizable record carrier means carrying a sequence of said data units erasably recorded thereon in areas of respectively corresponding unit length; first sensing means for sensing said data elements from said recorded data units, and for recording such data elements on said first record carrier means in replacement of previously recorded data elements; a plurality of second magnetizable record carrier means capable of having data erasably recorded thereon, said second record carrier means being respectively assigned to different sorting classifications; second sensing means for sensing recorded data elements from said second record carrier means and for recording such data elements on said second record carrier means in replacement of previously recorded data elements; first and second transportation means for respectively independently moving said first and second record carrier means relatively to said first and second sensing means, respectively, in steps corresponding to said respective unit lengths of recording areas; control storage means for storing character-representing data elements; transfer means connecting said first sensing means with said second sensing means for selectively transferring in an initial transfer operation character-representing data elements representing sorting of classification data from said first record carrier means to said control storage means, said transfer means including controllable gate means for permitting in a subsequent transfer operation the recording on said second record character means corresponding to said selected sorting classification of data units sensed from said first record carrier means, and for selectively transferring a first control signal stored in said control storage means from said control storage means to said second transportation means for controlling the operation of the latter; and selective control means for controlling the gate means of said transfer means by applying thereto a second control signal at a selected instant when any desired one of said character-representing data elements of any of the different denominational orders of said distinct data unit selected to serve as a classification data is sensed by said first sensing means from said first record carrier means, said selective control means including means for advancing said selective control means in synchronism with the sensing of consecutive ones of said character-representing data elements from said first record carrier, and setting means for causing said selective control means to produce said second control signal at said selected instant.

4. Apparatus as claimed in claim 1, including erasing means for erasing recorded data elements on said second record carrier means; and in which said transfer means are capable of permitting, in a first subsequent transfer operation the recording, on each of said second record carrier means, of data units sensed from said first record carrier means, and of causing, in a second subsequent transfer operation the erasing by said erasing means of the recorded data units from each of said second record carrier means except from that one thereof which corresponds to said selected sorting classification.

5. Apparatus as claimed in claim 1, wherein said transfer means are capable of selectively transferring character-representing data elements representing a plurality of different orders, respectively, of sorting classification data from said first record carrier means to said control storage means, and of permitting the recording, on each of said second record carrier means respectively corresponding to said plurality of different orders of said sorting classification, of data units sensed from said first record carrier means.

6. An apparatus as claimed in claim 1, including erasing means for erasing recorded data elements on said second record carrier means; and wherein said transfer means are capable of selectively transferring character-representing data elements representing a plurality of different orders of sorting classification data from said first record carrier means to said control storage means, and of permitting the recording, on each of said second record carrier means, of data units sensed from said first record carrier means, and of causing the erasing of said erasing means of the recorded data units from each of said second record carrier means except from those thereof which correspond respectively to said plurality of different orders of said selected sorting classification.

References Cited in the file of this patent

UNITED STATES PATENTS

| | | |
|---|---|---|
| 2,617,704 | Mallina | Nov. 11, 1952 |
| 2,648,589 | Hickman | Aug. 11, 1953 |